US006296103B1

(12) United States Patent
Gross

(10) Patent No.: US 6,296,103 B1
(45) Date of Patent: Oct. 2, 2001

(54) METHOD OF AND DEVICE FOR BUFFERING SHEETS OF CUT STOCK IN BLOCK SHAPED STACKS RANGED IN ROWS FOR CUTTING

(75) Inventor: Helmut Gross, Hofheim/Taunus (DE)

(73) Assignee: Adolf Mohr Maschinenfabrik GmbH & Co AG, Hofheim (DE)

( * ) Notice: Subject to any disclaimer, the term of this patent is extended or adjusted under 35 U.S.C. 154(b) by 0 days.

(21) Appl. No.: 09/438,039

(22) Filed: Nov. 10, 1999

(30) Foreign Application Priority Data

Dec. 28, 1998 (DE) .............................................. 981 24 486

(51) Int. Cl.[7] ...................................................... B65G 25/00

(52) U.S. Cl. ............................. 198/429; 198/433; 83/719

(58) Field of Search ..................................... 198/418, 426, 198/429, 431, 432, 433; 83/404, 713, 719, 726

(56) References Cited

U.S. PATENT DOCUMENTS 3,669,283 * 6/1972 Brown, Jr. ........................ 198/433 X
3,941,234 * 3/1976 Balch et al. ......................... 198/429
4,274,532 * 6/1981 Johnson ............................... 198/429
4,610,347 * 9/1986 Inoko ............................... 198/432 X
5,133,446 * 7/1992 Draghetti .......................... 198/429 X
6,164,045 * 12/2000 Focke et al. ...................... 198/429 X

FOREIGN PATENT DOCUMENTS

2172566 * 9/1986 (GB) .................................... 198/433

* cited by examiner

*Primary Examiner*—James R. Bidwell
(74) *Attorney, Agent, or Firm*—Max Fogiel

(57) ABSTRACT

A method and apparatus of buffering sheets of cut stock in block-shaped stacks ranged in rows between stock-cutting machinery and further processing machinery, whereby each row is also block-shaped. Each row produced by the cutting process is forwarded to a buffer's intake and thence to a marshaling area where it is combined with previously forwarded rows into a group. Each group is forwarded to the buffer's outtake and combined with any other rows already there. The most downstream row of the group is forwarded to the further-processing machinery.

19 Claims, 2 Drawing Sheets

FIG. 2
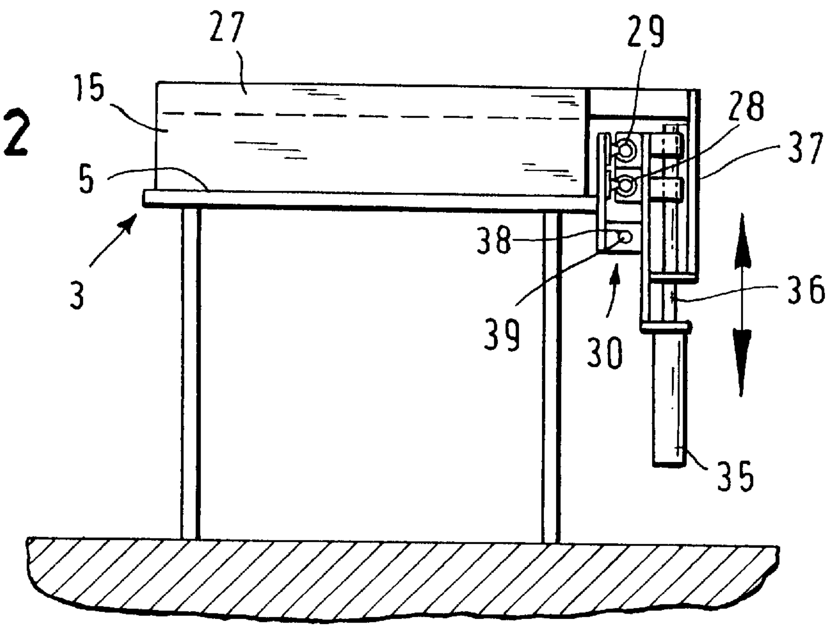
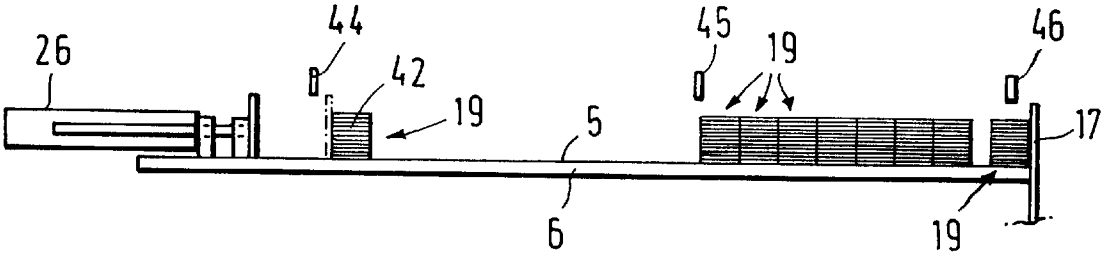
FIG. 3
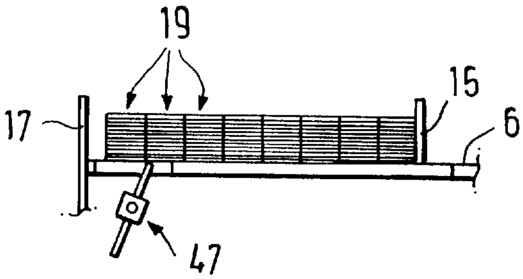
FIG. 4
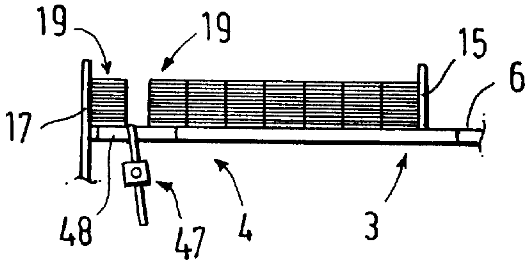
FIG. 5

METHOD OF AND DEVICE FOR BUFFERING SHEETS OF CUT STOCK IN BLOCK SHAPED STACKS RANGED IN ROWS FOR CUTTING

BACKGROUND OF THE INVENTION

The present invention concerns a method of and a device for buffering sheets of cut stock in block-shaped stacks ranged in rows between stock-cutting machinery and further-processing machinery.

A method of and a device for cutting stacked sheets of paper, cardboard, plastic, etc., especially sheet assemblages, is known from German A 3 101 911. The device is a guillotine. To ensure that the blade always cuts the stack along the intended line, the stack must be advanced below the blade very precisely. Even slight displacements, dimensional deviations due to curling paper for instance, can force the blade to cut the paper away from the intended line. Assemblages especially, with a number of labels printed on them, can accordingly be cut inside the print. To prevent this malfunction the sheets are printed with the separate printed matter not immediately mutually adjacent but with empty passages left between them. It is accordingly admittedly necessary to make additional cuts between the main cuts, although the procedure does prevent cutting into the printed matter. The stacks can also be trimmed at their margins before they are cut. The advantage of this approach is that, once the margins have been trimmed, the stack will be in a prescribed shape or format, a decisive feature for ensuring the accuracy of the following major cut. When labels are cut, the margin-trimmed block-shaped stack is initially cut parallel to the main cut and then parallel to any intermediate cuts and rotated 90° to allow main cuts and intermediate cuts if any to be made perpendicular to the original cuts. Subsequent to every 90° rotation, accordingly, every main cut will leave a row of smaller block-shaped stacks adjacent parallelling the blade, every row itself being block-shaped. The smaller stacks are forwarded to further-processing machinery, where they are punched or bundled for example.

From the processing steps hereintofore described it will be evident that the stock will necessarily leave the stock-cutting machinery discontinuously. It will accordingly take several minutes, two or three for instance, to make the marginal cuts and to cut the main stack into strips. During this time, no cut stock can be forwarded to the further-processing machinery. The further processing machinery, however, could easily handle the smaller stacks, bundling them or punching out irregularly shaped labels and then bundling them.

Every row of smaller stacks produced by the guillotine described in German A 3 101 911 must be removed from the vicinity of the blade manually and transferred to an adjacent counter, whence they can be forwarded manually to the further-processing machinery.

Stock-cutting machinery with two guillotines is known from European A 0 242 763. The downstream guillotine generates the rows of stacks, and a pusher removes them longitudinally. In practice, the pusher transfers each row generated in this system onto an adjacent counter and hence directly to further-processing machinery, where each stack is banded.

A multiple bundler with a feed is known from German U 29 804 929. This device is employed to bundle discontinuously supplied rows of finished stacks, large-format stock in other words, and not to handle rows of smaller stacks.

SUMMARY OF THE INVENTION

The object of the present invention is accordingly a method of and a device for buffering rows of stacked sheets of stock for cutting that will allow downstream continuous processing in further processing machinery of material discontinuously cut in stock cutting machinery.

This object is attained in accordance with the present invention by providing a special approach to buffering the rows of stacks resulting from each cut. Each row is forwarded to the buffer's intake and thence to a marshaling area. Depending on the cutting process and accordingly on the further supply of rows to the buffer's intake, several rows are assembled in the buffer's marshaling area and forwarded to its outtake. If there are any rows already there, the new rows are combined along with them into a group. Otherwise, they are forwarded directly to where the most downstream row will be the next supplied to the further-processing machinery. Whereas the rows in the outtake can be continuously supplied for further processing, the rows at the marshaling area will continue to be assembled and supplied to the outtake before the rows in the outtake can be processed. Thus, stacks or rows of stacks will always be available for further processing.

The stacks are composed of separate layers and not easy to handle. There is in particular a risk of the individual layers sliding over each other. The stacks and rows must accordingly be rotated as little as possible in the buffer. The rows must accordingly be forwarded from the buffer's intake to its marshaling area and from its marshaling area to its outtake in one direction. To ensure optimal spacing of the mechanical components that carry out the method, the rows should be forwarded from the stock-cutting machinery to the buffer's intake at a right angle to the direction they are forwarded from its intake to its marshaling area in. The rows should similarly be forwarded from the buffer's marshaling area to its outtake at a right angle to the direction they are forwarded from its outtake to the further-processing machinery in. The rows can in particular be forwarded from the stock-cutting machinery to the buffer's intake in a direction opposite the direction they are forwarded from its outtake to the further processing machinery in.

The rows or groups can in particular be forwarded in accordance with the present invention by pushing. This is an especially simply way to ensure that the evident stacks will be forwarded precisely into their intended positions. To ensure particularly simple forwarding of the individual rows, the row produced by a specific cutting process in one particular embodiment of the present invention can be electrostatically block-formed, especially before it is forwarded to the buffer's intake. Electrostatically block-forming a row allows it to be forwarded in various ways, especially by belts that can be positioned to convey the individual stacks in a row.

It should be impossible to initiate forwarding of the group from the marshaling area to the outtake while a row is being forwarded from the intake to the marshaling area. This feature will prevent forwarding from the intake to the marshaling area and forwarding from the marshaling area to the outtake from interfering with each other at the marshaling area.

It will be preferable for a row being forwarded to the further processing machinery to be separated from its adjacent row before being forwarded. This feature will prevent relative motion between the individual sheets while adjacent rows are being forwarded.

Another object of the present invention is a device for carrying out the method hereintofore described.

It is practical for some or all of the row-forwarding mechanisms to be pushers and especially pneumatically or electromechanically actuated pushers. The second row-forwarding mechanism is intended to forward a row released from the stock-cutting machinery far enough to allow the next row to be released. The third row forwarding mechanism forwards several rows released from the second row-forwarding mechanism to the fourth row-forwarding mechanism. The fourth row-forwarding mechanism forwards each row to the further-processing machinery individually. All row forwarding mechanisms, or pushers, are accordingly intelligently networked. The device can accordingly be provided with detectors that detect at least the ends of the strokes traveled by the row forwarding mechanism. These detectors can for example be light barriers, limit switches, etc. The row-forwarding mechanisms, the pushers, are regulated to prevent actuation of the second mechanism while the first is forwarding a row into the vicinity of the second and to prevent the third row-forwarding mechanism from initiating any forwarding motions toward the rows in the vicinity of the marshaling area on the counter while the second mechanism is about to forward a row. Furthermore, the third row-forwarding mechanism must not forward a group into the vicinity of the fourth row-forwarding mechanism while the latter is forwarding the row in question to the further-processing machinery.

Forwarding can be optimized, especially with respect to time, if the first and/or the third row-forwarding mechanism and/or the fourth row-forwarding mechanism can be raised and lowered. The third row-forwarding mechanism can in this event forward a group while the fourth row-forwarding mechanism is raised in order to forward the next row to the further-processing machinery, in particular when the latter is to punch or bundle the material.

One practical means of electrostatically block-forming the rows as hereintofore described is a component in the vicinity of the first row-forwarding mechanism.

Further characteristics of the method and device in accordance with the present invention will be evident from the subsidiary claims, the specification, and the figures. All characteristics and combinations thereof are essential to the present invention.

BRIEF DESCRIPTION OF THE DRAWINGS

One embodiment of the method and device in accordance with the present invention will now be specified but without limiting its scope in any way with reference to the accompanying drawing, wherein FIG. 2 is a section through the buffer along the line II—II in FIG. 1, FIG. 3 is a section through the buffer along the line III—III in FIG. 1 but showing only the essential components, FIG. 4 is a section through the buffer along the line IV—IV in FIG. 1 but showing only the essential components, and FIG. 5 is an illustration similar to FIG. 4 but showing one row separated from a group of rows.

DESCRIPTION OF THE PREFERRED EMBODIMENTS

Figure 1:
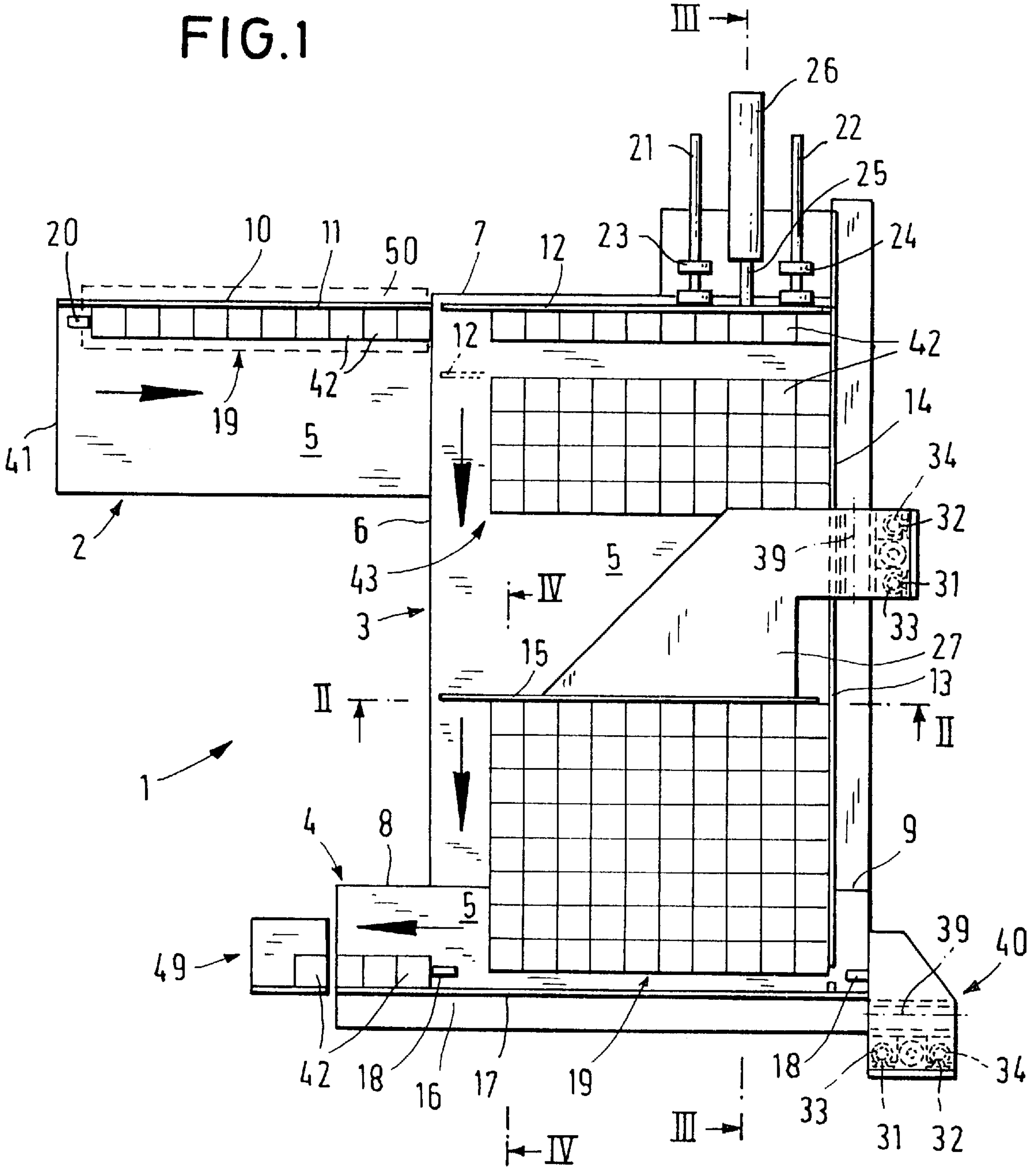
FIG. 1 is a top view of the buffer.

The buffer includes a counter 1 comprising an intake area 2, a marshaling area 3 and a layoff area 4. Areas 2, 3, and 4 are rectangular, appropriate for accommodating stacks of stock for cutting. Intake area 2 adjoins the longer side 6 of marshaling area 3 adjacent one shorter side 7. The longer side 8 of layoff area 4 adjoins the other shorter side 9 of marshaling area 3. The intake area 2 has a longer side 10 that essentially aligns with the shorter side 7 of marshaling area 3. In this vicinity is a straightedge 11 that extends along intake area 2 and is elevated above the surface 5 of marshaling area 3 slightly higher than the tallest stack of material being cut. Sliding back and forth in marshaling area 3 in a plane paralleling that of lateral straightedge 11 is a pusher 12, also in the form of a straightedge and similar in structure to straightedge 11. When pusher 12 is in the advanced position represented by the continuous lines in FIG. 1, the contact surfaces of straightedge 11 and pusher 12 are aligned. The opposite position of pusher 12 is represented in FIG. 1 by broken lines. Pusher 12 extends essentially over the total width of marshaling area 3. In the vicinity of the second longer side 13 of marshaling area 3 is a lateral straightedge 14 that extends over the total length of marshaling area 3 and considerably over the width of layoff area 4. Lateral straightedge 14 is similar in shape to lateral straightedge 11. In the vicinity of the second longer side 13 of marshaling area 3 is a pusher 15 in the form of a moving straightedge. Pusher 15 is similar in shape to pusher 12 and travels over a plane paralleling the plane traveled by pusher 12, although pusher 15 can travel essentially over the total length of marshaling area 3 and can be raised and lowered. Layoff area 4 has in the vicinity of its second longer side 16 a lateral straightedge 17 that parallels pushers 12 and 15 and extends over the total length of layoff area 4. Paralleling lateral straightedge 17 is a narrow pusher 18 that can be raised and lowered perpendicular to the surface 5 of marshaling area 3 and travels essentially over the total length of layoff area 4. Pusher 18 is located on the side of lateral straightedge 17 facing pusher 15 and is narrower and accordingly able to forward a row 19 of stacks longitudinally. Corresponding to pusher 18 is a pusher 20 in the vicinity of intake area 2. Pusher 20 travels parallel to and near the longer side 10 of intake area 2 and can forward a row 19 of stacks longitudinally. Pusher 20 can also be raised and lowered.

Pusher 12 can accordingly travel only horizontally, paralleling the surface 5 of marshaling area 3. Only that portion of pusher 20 in contact with row 19 of stacks is depicted. It is powered by a mechanism similar to the mechanism that drives pusher 18 and that will be specified hereinafter. These mechanisms are actuated in accordance with the actions carried out in buffering the stock, and it will also be possible to detect the ends of their strokes. Pusher 12 is connected to two connecting rods 21 and 22 that extend through stationary bearings 23 and 24. Pusher 12 is engaged by a piston rod 25 that operates in conjunction with a stationary pneumatic cylinder 26. Pushers 20 and pusher 12 are synchronized such that pusher 12 cannot move while pusher 20 is traveling toward marshaling area 3 and pusher 20 cannot move while pusher 12 is traveling toward pusher 12.

A flat pusher accommodation 27 paralleling the surface 5 of marshaling area 3 accommodates the upper edge of pusher 15. Two connecting rods 27 and 28 are accommodated in counter 1 in the vicinity of the second longer side 13 of marshaling area 3 and extending along it. Connecting rods 27 and 28 accommodate a carriage 30. Carriage 30 accommodates vertical bearings 31 and 32. Connecting rods 33 and 34 extend through bearings 31 and 32 and are connected to pusher accommodation 27. Carriage 30 accommodates a pneumatic cylinder 35, its piston rod 36 engaging a component 37 mounted on pusher accommodation 27. Carriage 30 is provided with a threaded accommodation bore 38 that a spindle 39 fits into. The mechanisms that drive the spindle 39, a motor for example, are not illustrated. As the spindle rotates, carriage 30 will travel toward connecting rods 28 and 29, moving pusher 15 horizontally or, when pneumatic cylinder 35 is engaged, vertically. What is essential here is that spindle 39 and pneumatic cylinder 35 conform to the particular stage of events involved in the buffering process and in particular that the vertical and horizontal motions of pneumatic cylinder 35 will be intelligently controlled. Means must accordingly be provided of detecting the horizontal position of pusher 15 at any time, whether for instance, it happens to be above spindle 39. This capability depends on the overlap between the operating ranges involved, more precisely between the ranges of pusher 12 and pusher 15 on the one hand and between those of pusher 15 and pusher 18 on the other, as will be specified hereinafter.

Pushers 18 and 20 are mounted similar to pusher 15, allowing them to move both vertically and horizontally. The accommodation for pusher 18 is similar to the accommodation 27 for pusher 15 and the same reference number is employed for simplicity's sake. Pusher 18 is accommodated in a bearing 40 similar to the accommodation 27 illustrated in FIG. 2. Like pusher 15, pusher 18 is controlled intelligently to confirm with the particular operations involved.

A row 19 of already cut stacks is forwarded by pusher 20 from an unillustrated guillotine to intake area 2 and hence to marshaling area 3. FIG. 1 illustrates an intermediate position of pusher 20, in which it remains until downstream pusher 12 has forwarded farther the row 19 previously forwarded to it by pusher 20. As pneumatic cylinder 26 engages, each row 19, comprising ten stacks 42, is forwarded to a prescribed extent along marshaling area 3 by pusher 12, now represented by the broken lines. Once row 19 has been forwarded this distance, pusher 12 rises and retreats and descends again behind and ready to forward a new row produced by the continuous action of the guillotine. Pusher 20 now forwards the next row 19 into the vicinity of pusher 12. Pusher 12 engages again and forwards the row. This row in turn forwards farther the latest row forwarded by pusher 12. The rows combine into a group. In contrast to the repeatedly operating pusher 12, the intelligently controlled pusher 15 forwards a group 43 of rows 19 farther, constantly supplying pusher 18 with rows to be forwarded out. Once enough rows 19 have been forwarded by pusher 12 and a large enough group 43 has accumulated, pusher 15 is lifted and, as pusher 12 returns, retracted into the limiting position 44 illustrated in FIG. 3, which, however, is to be considered only an indicator, where it descends behind group 43. Now, the finished group 43 if forwarded by pusher 15 and combined with the rows 19 still in the vicinity of layoff area 4 and in the adjacent vicinities of marshaling area 3. This situation is illustrated in FIG. 1. Four rows 19 can for example have been forwarded by pusher 15 and combined with four other rows 19 still remaining in marshaling area 3 and layoff area 4. The intelligently controlled pusher 15 will accordingly move only when and only to the extent required by the buffering process. When the guillotine does not release any rows 19 for some time, while for example it is cutting margins and intermediates, pusher 18 might expel only the last row in the vicinity of layoff area 4, in which event intelligently controlled pusher 15 would forward the group 43 obtained from the vicinity of pusher 12 into the vicinity adjacent to pusher 18. The intermediate position 45 of pusher 15, also to be considered only an indicator, is illustrated in FIG. 1. Also illustrated is the position 46 of pusher 18.

FIGS. 4 and 5 show that a front row 19 of stacks associated with pusher 18 is never immediately expelled by pusher 18 once it has been forwarded by pusher 18, but is separated from its neighboring row by an in-itself known cylinder 47 with spines that extend through slots in layoff area 4 and revolve down into contact with the individual stacks 42 as the cylinder turns, forcing them against the lateral straightedge 17 in layoff area 4. FIG. 1 shows pusher 18 in two positions, specifically in a position, before its adjacent row 19 has been separated out by spined cylinder 47, and in an intermediate position as the row is being forwarded to further-processing machinery 49, some of the stacks 42 already being further processed.

FIG. 1 shows a component 50 in the vicinity of intake area 2 that electrostatically block-forms a row 19 of stacks produced by the cutting process. A component of this type (the VBS 951, manufactured by Segbert GmbH & Co., 48619 Heek) is state of the art. Each row 19 is forwarded through the buffer block-formed and is unformed just before being released to the further-processing machinery, accordingly advancing through the buffer in the form of a more or less stable group.

What is claimed is:

1. A method for buffering sheets of cut stock in block-shaped stacks positioned in rows between stock-cutting machinery and further processing machinery, each of said rows being also block-shaped, the method comprising the steps of:

forwarding each row produced by a discontinuous cutting process to a buffer's intake;

forwarding thereafter said each row to a marshaling area where said each row is combined with previously forwarded rows into a group;

forwarding each said group to a buffer's outtake and combining each said group with any other rows already there and forwarding the most downstream row of the group to the further processing machinery for continuous processing of said downstream row, rows of stacked sheets for cutting being buffered for continuous processing in said further processing machinery after being discontinuously cut in said stock cutting machinery, a plurality of stacks impinging on the cutting process in a row and leaving the cutting process discontinuously due to a time interval between each cutting step, a plurality of stacks forming a group inside said buffer.

2. A method as defined in claim 1, wherein the rows are forwarded from the buffer's intake to said marshaling area and from said marshaling area of the buffer's outtake in one direction.

3. A method as defined in claim 1, wherein the rows are forwarded from the stock-cutting machinery to the buffer's intake at a right angle to the direction that the rows are forwarded from the buffer's intake to said marshaling area.

4. A method as defined in claim 1, wherein the rows are forwarded from the buffer's marshaling area to the buffer's outtake at a right angle to the direction that the rows are forwarded from said outtake to the further-processing machinery.

5. A method as defined in claim 1, wherein the rows or groups are forwarded by pushing.

6. A method as defined in claim 1, wherein the row produced by a specific cutting process is electrostatically block-formed before the row is forwarded to the buffer's intake.

7. A method as defined in claim 1, wherein the group from the marshaling area cannot be forwarded to the outtake while a row is being forwarded from the intake to the marshaling area.

8. A method as defined in claim 1, wherein a row forwarded to the further-processing machinery is separated from an adjacent row before being forwarded.

9. A method as defined in claim 1, wherein said further processing comprises punching or bundling.

10. Apparatus for buffering sheets of cut stock in block-shaped stacks positioned in block-shaped rows between stock-cutting machinery and further processing machinery, comprising:

a buffer with a counter accommodating the stacks;

first means for forwarding each row of stacks produced by the cutting process along the counter in a first direction;

second means for forwarding the row already forwarded by said first means along the counter in a second direction perpendicular to said first direction;

third means for forwarding the group of rows or combined group of rows along said counter in said second direction, paths traveled by said second and said third means overlapping; and fourth means for forwarding the frontmost row from said counter to said further-processing machinery in a direction perpendicular to said second direction.

11. Apparatus as defined in claim 10, wherein at least said first means is a pneumatically or electromechanically actuated pusher.

12. Apparatus as defined in claim 10, wherein at least said first row forwarding means can be raised and lowered.

13. Apparatus as defined in claim 11, wherein said second and said third means are pushers traveling along the counter, said first and fourth means are pushers traveling across the counter.

14. Apparatus as defined in claim 11, wherein said second or said third means is a pusher extending substantially over the width of an area of the associated counter and is substantially higher than the highest one of said stacks.

15. Apparatus as defined in claim 10, including detectors for detecting at least ends of the paths traveled by at least said first means.

16. Apparatus as defined in claim 15, wherein said detectors are light barriers or limit switches.

17. Apparatus as defined in claim 10, including means for electrostatically forming the rows in block-shaped form in the vicinity of the first row-forwarding means.

18. Apparatus as defined in claim 10, including a spined cylinder rotating in the counter's outtake adjacent to said fourth means and paralleling the path of said fourth means.

19. A method for buffering sheets of cut stock in block-shaped stacks positioned in rows between stock-cutting machinery and further processing machinery, each of said rows being also block-shaped, the method comprising the steps of:

forwarding each row produced by a discontinuous cutting process to a buffer's intake;

forwarding thereafter said each row to a marshaling area where said each row is combined with previously forwarded rows into a group;

forwarding each said group to a buffer's outtake and combining each said group with any other rows already there and forwarding the most downstream row of the group to the further processing machinery, the row produced by a specific cutting process is electrostatically block-formed before the row is forwarded to the buffer's intake.

* * * * *

UNITED STATES PATENT AND TRADEMARK OFFICE

CERTIFICATE OF CORRECTION

PATENT NO. : 6,296,103 B1 
DATED : October 2, 2001
INVENTOR(S) : Gross

It is certified that error appears in the above-identified patent and that said Letters Patent is hereby corrected as shown below:

Title page,
Item [73], the Assignee should read as follows:
-- [73] Aldof Mohr Maschinenfabrik GmbH & Co. Kg, Hofheim (DE) --

Signed and Sealed this

Seventeenth Day of September, 2002

*Attest:*

JAMES E. ROGAN

*Attesting Officer* *Director of the United States Patent and Trademark Office*